(12) United States Patent
Funabashi

(10) Patent No.: US 6,259,113 B1
(45) Date of Patent: Jul. 10, 2001

(54) PROCESS FOR ERASING A RESIDUAL RADIATION IMAGE

(75) Inventor: Makoto Funabashi, Ashigara-kami-gun (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/328,003

(22) Filed: Jun. 8, 1999

(30) Foreign Application Priority Data

Jun. 8, 1998 (JP) .................................................. 10-175382

(51) Int. Cl.⁷ .................................................. G03B 42/02
(52) U.S. Cl. .................................................. 250/588
(58) Field of Search .................................................. 250/588

(56) References Cited

U.S. PATENT DOCUMENTS

| | | | | |
|---|---|---|---|---|
| 5,371,377 | * | 12/1994 | Struye et al. | 250/588 |
| 5,422,208 | * | 6/1995 | Kojima et al. | 430/19 |
| 5,530,259 | * | 6/1996 | Arakawa | 250/584 |
| 5,530,261 | * | 6/1996 | Yasuda | 250/588 |
| 5,534,709 | * | 7/1996 | Yoshimoto et al. | 250/588 |
| 5,534,710 | * | 7/1996 | Suzuki | 250/588 |
| 5,550,386 | * | 8/1996 | Kojima et al. | 250/588 |
| 5,665,976 | * | 9/1997 | Arakawa | 250/588 |
| 5,877,508 | * | 3/1999 | Arakawa et al. | 250/588 |
| 5,880,476 | * | 3/1999 | Suzuki | 250/484.4 |
| 6,140,663 | * | 10/2000 | Neary et al. | 250/588 |

\* cited by examiner

Primary Examiner—Robert H. Kim
Assistant Examiner—Allen C Ho
(74) Attorney, Agent, or Firm—Sughrue, Mion, Zinn, Macpeak & Seas, PLLC

(57) ABSTRACT

A process for erasing a radiation image remaining in a stimulable phosphor sheet in which a radiation image was recorded and then read by applying stimulating rays and collecting stimulated emission produced from the phosphor sheet is performed by applying erasing light onto the phosphor sheet under the condition that both front and back surfaces of the phosphor sheet are irradiated with the erasing light so that the ratio of amount of erasing light applied onto the front surface to that applied onto the back surface would be in the range of 51/49 to 75/25.

7 Claims, 3 Drawing Sheets

PROCESS FOR ERASING A RESIDUAL RADIATION IMAGE

FIELD OF THE INVENTION

The present invention relates to a process for erasing a radiation image remaining in a stimulable phosphor sheet employed in the radiation image recording and reproducing method utilizing a stimulable phosphor.

BACKGROUND OF THE INVENTION

As a method replacing a conventional radiography, a radiation image recording and reproducing method utilizing a stimulable phosphor was proposed, and has been practically employed. The radiation image recording and reproducing method employs a stimulable phosphor sheet (i.e., radiation image storage panel) comprising a stimulable phosphor, and comprises the steps of causing the stimulable phosphor of the phosphor sheet to absorb radiation energy having passed through an object or having radiated from an object; sequentially exciting the stimulable phosphor with an electromagnetic wave such as visible light or infrared rays (hereinafter referred to as "stimulating rays") to release the radiation energy stored in the phosphor as light emission (i.e., stimulated emission); photoelectrically detecting the emitted light to obtain electric signals; and reproducing the radiation image of the object as a visible image from the electric signals. The sheet thus treated is subjected to a step for erasing a radiation image remaining therein, and then stored for the next recording and reproducing procedure. Thus, the stimulable phosphor sheet can be repeatedly employed.

In the above method, a radiation image is obtainable with a sufficient amount of information by applying a radiation to the object at a considerably smaller dose, as compared with a conventional radiography using a combination of a radiographic film and radiographic intensifying screen. Further, the method is very advantageous from the viewpoints of conservation of resource and economic efficiency because the stimulable phosphor sheet can be repeatedly used while the radiographic film is consumed for each radiographic process in the conventional radiography.

The stimulable phosphor sheet has a basic structure comprising a support and a stimulable phosphor layer provided thereon. If the phosphor layer is self-supporting, the support may be omitted. The phosphor layer usually comprises a binder and stimulable phosphor particles dispersed therein, but it may consist of agglomerated phosphor without binder. The phosphor layer containing no binder can be formed by deposition process or firing process. Further, the layer comprising agglomerated phosphor soaked with a polymer is also known. In any types of phosphor layers, the stimulable phosphor emits stimulated emission when excited with stimulating rays after having been exposed to a radiation such as X-rays. Accordingly, the radiation having passed through an object or radiated from an object is absorbed by the phosphor layer of the stimulable phosphor sheet in an amount proportional to the applied radiation dose, and a radiation image of the object is produced in the sheet in the form of a latent image (i.e., radiation energy-stored image). The radiation energy-stored image can be released as stimulated emission by sequentially irradiating the phosphor sheet with stimulating rays. The stimulated emission is then photoelectrically detected to give electric signals, so as to reproduce a visible image from the electric signals. On the free surface (surface not facing the support) of the phosphor layer, a protective film is generally placed to keep the phosphor layer from chemical deterioration or physical shock.

The radiation image recording and reproducing method can be performed by means of an all-in-one type apparatus comprising recording means (by which a radiation image is recorded on the phosphor sheet), reading means (by which the image recorded in the phosphor sheet is read by the steps of exciting the stimulable phosphor with stimulating rays to release stimulated emission and photoelectrically detecting the emission), erasing means (by which the radiation image remaining in the phosphor sheet is erased with erasing light), and conveying systems connecting each means for conveying the phosphor sheet. The above-mentioned means may be separated into two apparatuses, namely a recording apparatus comprising the recording means and a reading apparatus comprising the reading means and the erasing means.

The radiation image recorded in the phosphor sheet is generally read by applying stimulating rays onto one surface side (the phosphor layer side) of the phosphor sheet and collecting light emitted by the phosphor particles by means of a light-collecting means from the same side. A system for reading the image from one side of the sheet in this manner is referred to as "single-side reading system". However, there is a case that the light emitted by the phosphor particles should be collected on both sides of the phosphor sheet. For instance, there is a case that it is desired to collect the emitted light as much as possible. There is also a case that the radiation image recorded in the phosphor layer varies along the depth of the layer, and that the variation should be detected. A system for reading the image from both sides of the sheet is referred to as "double-side reading system". Japanese Patent Provisional Publication No. 55(1980)-87970, for example, discloses the double-side reading system.

Each of Japanese Patent Provisional Publications No. 7(1995)-174897, 7(1995)-287100 and 8(1996)-62750 discloses a process and an apparatus for applying erasing light onto both surfaces of the sheet after reading the recorded image according to the double-side reading system, so as to release the radiation energy which remains after the reading procedure.

The radiation image recording and reproducing method has various advantages described hereinbefore, but it is still desired for the method to have a higher sensitivity and to provide an image of high quality (high sharpness, high graininess, etc.).

The image quality is generally impaired by noises caused by a residual radiation image and other stored radiation energy given by environmental radiation or radioactive isotopes contaminated into the phosphor sheet. For obviating these noises, the erasing procedure is required. Naturally, it is desired that the erasing procedure be carried out as effectively as possible. For example, it is desired that the time and the energy for erasing is shorter and lower, respectively. In addition, it is desired that the ratio of amount of stimulated emission after erasing to that before erasing (hereinafter, this ratio is referred to as "erasing value") is as small as possible.

SUMMARY OF THE INVENTION

It is an object of the present invention to provide a process for effectively erasing a radiation image remaining in a stimulable phosphor sheet.

The inventor studied for the purpose of improving the efficiency of erasing, and found the following facts. A radiation image remaining in the stimulable phosphor sheet (particularly, for double-side reading system) is more effectively erased by applying erasing light onto both surfaces of the sheet, as compared with applying the light onto one surface. Further, in that case, if the amount of erasing light applied onto the front surface is different from that onto the back surface under the specific condition, the efficiency of erasing is much improved. From these facts, the inventor achieved the present invention.

The present invention resides in a process for erasing a radiation image remaining in a stimulable phosphor sheet in which a radiation image was recorded and then read by applying stimulating rays and collecting stimulated emission produced from the phosphor sheet, comprising applying erasing light onto the phosphor sheet under the condition that both front and back surfaces of the phosphor sheet are irradiated with the erasing light so that the ratio of amount of erasing light applied onto the front surface to that applied onto the back surface would be in the range of 51/49 to 75/25.

In the present specification, the "front surface" means the surface of the stimulable phosphor layer (if a protective film is provided on the phosphor layer, it means the free surface of that protective film), and the "back surface" means the bottom surface of the support (if a protective film is provided on the bottom surface of the support, it means the free surface of that protective film).

DETAILED DESCRIPTION OF THE INVENTION

The preferred embodiments of the invention are as follows.

(1) The ratio of amount of erasing light applied onto the front surface (front erasing light) to that applied onto the back surface (back erasing light) is in the range of 51/49 to 65/35.

(2) The surfaces of the phosphor sheet are irradiated with a first erasing light of UV or visible wavelength, and then irradiated with a second erasing light containing no UV component.

(3) The first erasing light comprises light of a wavelength longer than 370 nm, and the second erasing light does not contain light of a wavelength shorter than 500 nm.

(4) The ratio of amount of the second erasing light to that of the first erasing light is in the range of 15/85 to 45/55.

(5) The stimulable phosphor sheet is for doubleside reading system radiation image recording and reproducing method.

(6) The stimulable phosphor sheet comprises an essentially transparent support and a phosphor layer provided thereon containing a europium or cerium activated alkaline earth metal halide stimulable phosphor.

By referring to the attached drawings, the process of the invention is described below in more detail.

Figure 1:
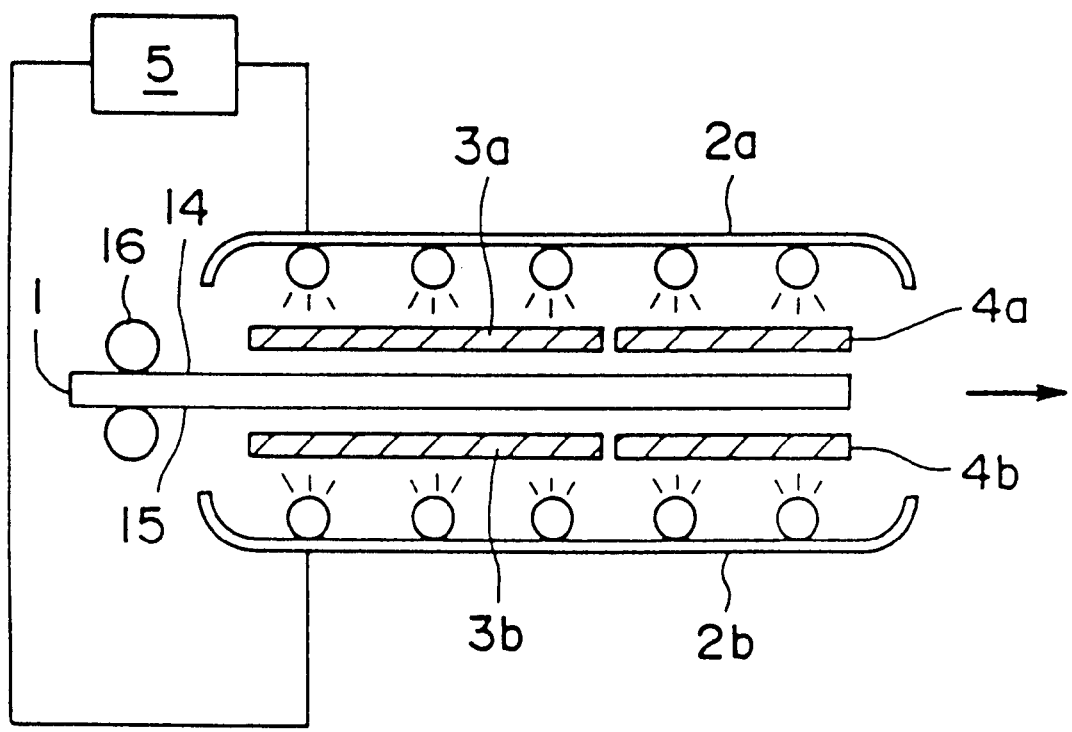
FIG. 1 schematically shows an erasing apparatus for performing the process of the invention.
Figure 2:
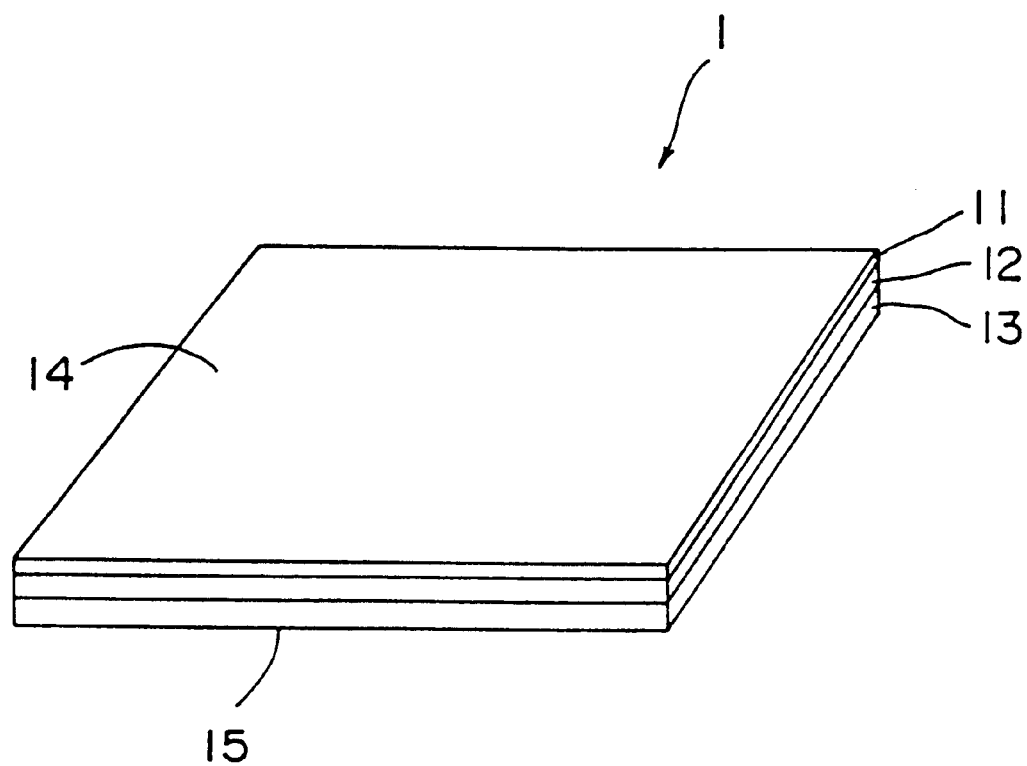
FIG. 2 is a sketch of a stimulable phosphor sheet to which the process of the invention can be applied.

FIG. 1 schematically shows an erasing apparatus for performing the process of the invention, and FIG. 2 is a sketch of a stimulable phosphor sheet to which the process of the invention can be applied.

In FIG. 2, the stimulable phosphor sheet 1 comprises a transparent plastic support 13 and a stimulable phosphor layer 12 provided thereon. The phosphor layer 12 comprises a binder and stimulable phosphor particles dispersed therein. On the phosphor layer 12, a protective film 11 is provided. In this case, the front surface 14 is the surface of the protective film 11, and the back surface 15 is the bottom surface of the support 13.

The erasing apparatus shown in FIG. 1 comprises erasing light sources (erasing lamps) 2a, 2b provided above and below, respectively; UV cut-filters 3a, 3b and additional sharp cut-filters 4a, 4b arranged below and above of the lamps; a light controller 5; and a conveying roller 16.

The erasing light sources 2a, 2b emit light containing both UV and visible components. Examples of the erasing light sources include various fluorescent lamps, mercury lamps, and metal halide lamps. Examples of the fluorescent lamps include normal fluorescent lamps (e.g., white lamp, warm white lamp, daylight lamp, incandescentlike color lamp such as lamps of W-DL, W-SDL and W-EDL) and cold cathode fluorescent lamps (e.g., green lamp, blue lamp, LCD lamp). Any of these fluorescent lamps emit light having a broad band spectrum ranging from 300 nm to 750 nm In the spectrum, there is a wide bright region around 600 nm. For example, light emitted from a normal fluorescent lamp has intense bright lines at approx. 450 nm and 550 nm. Since these lines are suitably positioned, normal fluorescent lamps are preferably employed. A mercury lamp emits light having several intense bright lines in the range of 350 nm to 600 nm.

The UV cut-filters 3a, 3b intercept UV light (e.g., light of a wavelength shorter than approx. 370 nm), but visible light (light of a wavelength longer than UV region) passes through them. An example of the UV cut-filter is "N-169" ([trade name], available from Nitto-Jushi Co., Ltd.). The sharp cut-filters 4a, 4b intercept UV light and a part of visible light (e.g., light of a wavelength shorter than approx. 500 nm), but light of a wavelength longer than the above range passes through them. An example of the sharp cut-filter is "N-039" ([trade name], available from Nitto-Jushi Co., Ltd.). Since these filters remove UV component of a wavelength shorter than 370 nm from the erasing light, the sensitivity of the phosphor sheet can be kept from deterioration even if the phosphor sheet is exposed to the erasing light for a long time. The amount of the erasing light is controlled by means of the light controller 5.

After the image was read in the double-side reading system, the stimulable phosphor sheet 1 is placed so that the front surface 14 and the back surface 15 would be the top and the bottom, respectively. The phosphor sheet 1 thus placed is then transferred to the space between the erasing light sources 2a, 2b by means of the conveying roller 16. While the phosphor sheet 1 moves in the direction of the arrow, both surfaces of the phosphor sheet 1 are exposed to the first erasing light containing no UV component. The first erasing light radiates from the erasing light sources 2a, 2b, and then passes through the UV cut-filters 3a, 3b. Preferably, the first erasing light is in the wavelength region longer than 370 nm. After the irradiation by the first erasing light is made, both surfaces of the phosphor sheet 1 are exposed to the second erasing light containing neither UV light nor a part of visible light. The second erasing light radiates from the erasing light sources 2a, 2b, and then passes through the sharp cut-filters 4a, 4b. Preferably, the second erasing light is in the wavelength region longer than 500 nm.

In the above procedure, the erasing light is controlled by the light controller 5 so that the ratio of amount of erasing light applied onto the front surface 14 (front erasing light) to that applied onto the back surface (back erasing light) would be in the range of 51/49 to 75/25.

For effective erasing, the ratio of amount of stimulated emission after erasing to that before erasing (i.e., erasing value) is desired to be as small as possible. The "stimulated emission before erasing" (often referred to as "initial stimulated emission") here means the stimulated emission produced by the stimulable phosphor sheet when excited with stimulating rays after having been exposed to a radiation such as X-rays. On the other hand, the "stimulated emission after erasing" here means the stimulated emission emitted by the phosphor sheet when excited again with the stimulating rays after having been subjected to the erasing procedure with the erasing light. Since the radiation and the stimulating ray are generally applied onto only the front surface, energy is much stored in the front surface than in the back surface. Accordingly, the erasing amount of the front surface (front erasing value), rather than that of the back surface (back erasing value), is preferably as small as possible. Further, the difference between the front and the back erasing values preferably is less than 20% based on the back erasing value (i.e., the ratio of the front erasing value to the back one preferably is in the range of 0.8 to 1.2).

Figure 3:
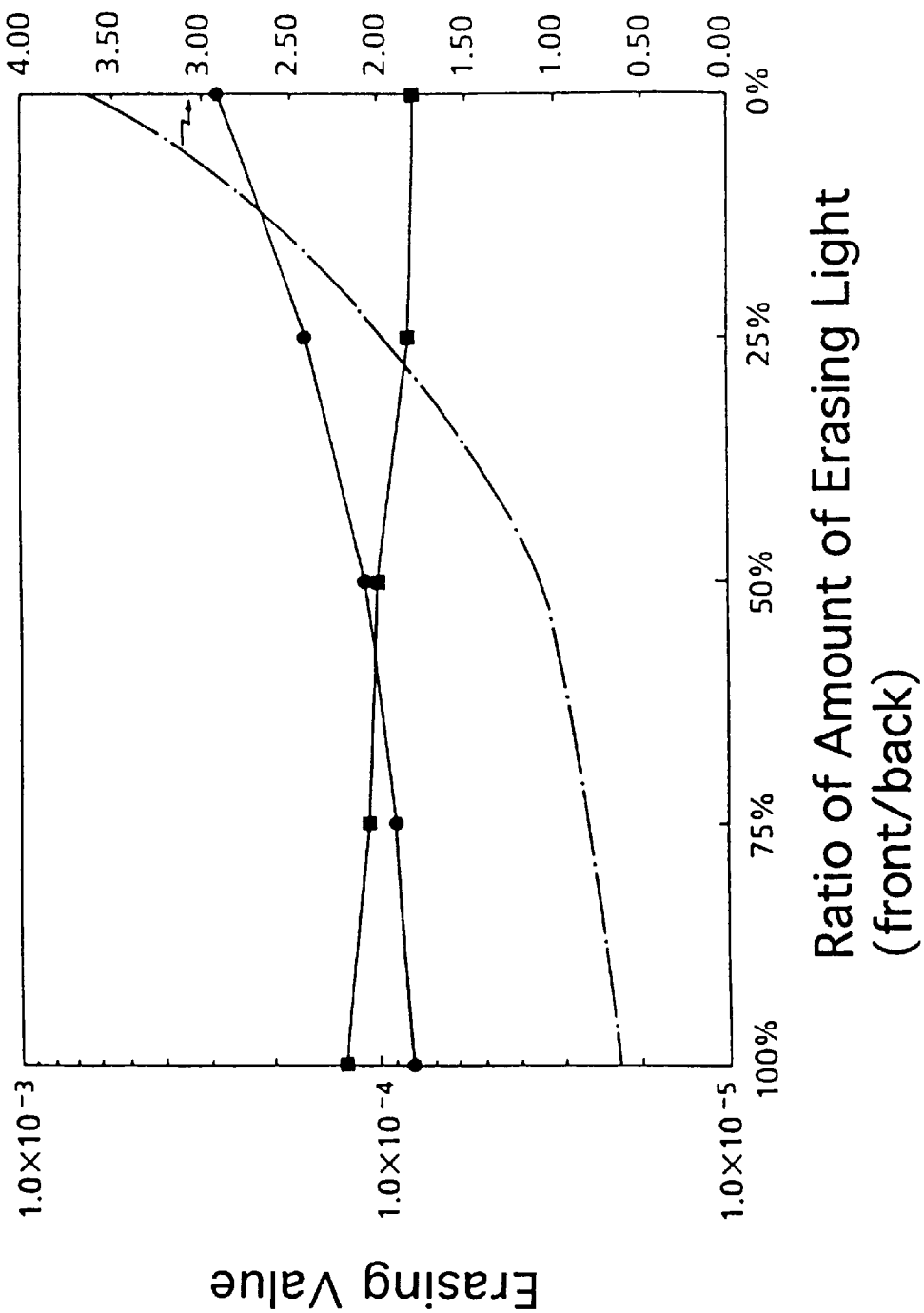
FIG. 3 indicates a relation between the erasing value and the percentage of erasing light applied onto the front surface (front erasing light), and a relation between that percentage and the ratio of the erasing value of the front surface (front erasing value) to that of the back surface (back erasing value).

FIG. 3 shows a relation between the erasing value (each of the front and the back erasing values) and the percentage of the front erasing light (the erasing light applied onto the front surface), and a relation between that percentage and the ratio of the front erasing value to the back one. The percentage of the front erasing light (the front erasing light percentage) is calculated under the condition that the total amount of the erasing light applied onto both surfaces (i.e., the total amount of the front and the back erasing light) is set at 100%. In FIG. 3, the front erasing light percentage is plotted on the horizontal axis, and the erasing value and the ratio of front/back erasing value are plotted on the left and the right vertical axes, respectively. The plots and lines in FIG. 3 mean as follows.

The bent line connecting solid circles indicates a relation between the front erasing value and the front erasing light percentage, and the line connecting solid squares indicates a relation between the back erasing value and the front erasing light percentage. The chain line indicates a relation between the ratio of front/back erasing value and the front erasing light percentage.

FIG. 3 teaches the following facts. If the front age erasing light percentage is approx. 57%, the front and the back erasing values are the same (i.e., the front/back erasing value ratio is 1.0). Further, when the percentage is less than approx. 75%, the front/back erasing value ratio is more than 0.8. Accordingly, if the ratio of amount of the front erasing light to that of the back erasing light (the ratio of front/back erasing light) is in the range of 51/49 to 75/25, the front erasing value is relatively small and the difference between the front and the back erasing values is less than 20% based on the back erasing value. The ratio of front/back erasing light preferably is in the range of 51/49 to 65/35. In FIG. 3, the plots of front erasing value range more widely than those of back erasing value. According to the inventor's understanding, the reason is that stimulating energy is much stored in the front surface than in the back surface.

The erasing procedure is preferably performed by sequentially applying the first and the second erasing light to the phosphor sheet after the reading step. The first erasing light containing light of a relatively short wavelength excites electrons trapped in deep energy levels and promotes them to shallow levels or releases their energy, and then the second erasing light of a longer wavelength excites the electrons in the shallow levels to release their energy. Thus, the energy of electrons trapped in various energy levels of the stimulable phosphor can be efficiently released to erase a radiation image remaining in the sheet.

The ratio of amount of the second erasing light to that of the first erasing light (the ratio of second/first erasing light) preferably is in the range of 15/85 to 45/55 (more preferably 20/80 to 40/60), so as to effectively release the energy of electrons trapped in various energy levels. The ratio can be controlled by adjusting the lengths of the filters, the number of the lamps, or the light intensity.

In the above manner, two kinds of erasing light are sequentially applied onto both surfaces of the phosphor sheet in different amounts. By the erasing procedure thus performed, not only a radiation image remaining in the phosphor sheet after reading but also other stored radiation energy given by, for example, environmental radiation can be removed. The apparatus for performing the process of the invention is not restricted to that shown in FIG. 1. Any erasing apparatus can be employed as long as both surfaces of the phosphor sheet are irradiated with erasing light in the above-mentioned light-amount ratio. For example, the lamps for the first erasing light may be different from those for the second erasing light, or transparent filters may be used in place of the UV cut filters. Further, the process may be performed with only one kind of erasing light.

The process of the invention can be utilized in various known radiation image recording and reproducing method. In particular, the process is suitably utilized for double-side reading system. Further, the process can be also utilized for a system in which reading and erasing are performed at the same time. In that system, signals having been read from a part of the phosphor sheet are immediately erased while other signals recorded in the next area of the same sheet are sequentially being read. If the process of the invention is adopted in this system, the time for performing all procedures can be reduced and the apparatus can be down-sized. By the process of the invention, not only a radiation image remaining after reading in the phosphor sheet but also other stored radiation energy given by environmental radiation or radioactive isotope contaminated in the sheet can be efficiently erased.

As described above, the process of the invention is preferably applied to a stimulable phosphor sheet for double-side reading system radiation image recording and reproducing method. The phosphor sheet for the double-side reading system basically has a multi-layered structure comprising a transparent support and a phosphor layer provided thereon. Usually, a protective film is provided on the top and/or the bottom surface of the body.

As the stimulable phosphor incorporated in the phosphor layer, a phosphor giving a stimulated emission of a wavelength in the range of 300 to 500 nm when it is irradiated with stimulating rays of a wavelength in the range of 400 to 900 nm is preferably employed. In Japanese Patent Provisional Publications No. 2(1990)-193100 and No. 4(1992)-310900, some examples of the stimulable phosphor are described in detail. Examples of the preferred phosphors include an europium or cerium activated alkaline earth metal halide phosphor, and a cerium activated oxyhalide phosphor.

The process of the invention is not restricted to applying to a stimulable phosphor sheet for double-side reading system, and is also usable for a stimulable phosphor sheet of various known types (e.g., a stimulable phosphor sheet for single-side reading system), as long as a residual image can be erased by irradiating the back surface of the phosphor sheet with erasing light.

EXAMPLES

A stimulable phosphor sheet comprising a plastic support and a phosphor layer provided thereon was prepared. The phosphor layer was composed of a binder and stimulable phosphor ($BaFBr_{0.85}I_{0.15}:0.01Eu^{2+}$) particles dispersed therein. The front surface (the surface of the phosphor layer) of the sheet was exposed to X-rays (80 KVp, 1 R), and then excited with He-Ne laser light (632.8 nm). The stimulated emission emitted by the phosphor was collected by means of photomultipliers from both surface sides (i.e., the front and the back surface sides) of the phosphor sheet. Thus, each of the front and the back initial stimulated emission was measured.

Both surfaces of the sheet were then exposed to the erasing light in the apparatus shown in FIG. 1. In the apparatus, incandescent-like color fluorescent lamps were used as the erasing lamps. The light emitted by the lamps was filtered through a UV cut-filter (N-169 [trade name], available from Nitto-Jushi Co., Ltd.) or a yellow filter, and applied onto the phosphor sheet as the first or the second erasing light, respectively. The ratio of the filter length (UV cut-filter:yellow filter) was adjusted at 3:2. The total amount of erasing light and the ratio of front/back erasing light were set at 500,000 lxs (Lux.sec) and 50/50, respectively.

After the erasing procedure was complete, each surface of the phosphor sheet was excited again with He-Ne laser light to measure the stimulated emission in the above-mentioned manner. From the obtained values, the erasing value (the ratio of the amount of stimulated emission after erasing to that of initial stimulated emission) on each surface was calculated.

Independently, the above-mentioned procedures were repeated except that the ratio of front/back erasing light was varied in the range of 100/0 to 0/100 (while the total erasing light was kept at 500,000 lxs). Thus, the front and back erasing values and the ratio of front/back erasing value were obtained.

The results are set forth in Table 1, and shown in FIG. 3.

TABLE 1

| | front erasing light percentage (%) | | | | |
|---|---|---|---|---|---|
| | 100 | 75 | 50 | 25 | 0 |
| | | | erasing light (lxs) | | |
| front | 500,000 | 375,000 | 250,000 | 125,000 | 0 |
| back | 0 | 125,000 | 250,000 | 375,000 | 500,000 |

TABLE 1-continued

| | erasing value | | | | |
|---|---|---|---|---|---|
| front | $8.1 \times 10^{-5}$ | $8.9 \times 10^{-5}$ | $1.1 \times 10^{-4}$ | $1.6 \times 10^{-4}$ | $2.9 \times 10^{-4}$ |
| back | $1.3 \times 10^{-4}$ | $1.1 \times 10^{-4}$ | $1.0 \times 10^{-4}$ | $8.2 \times 10^{-5}$ | $7.9 \times 10^{-5}$ |
| | | | front/back erasing value ratio | | |
| | 0.65 | 0.84 | 1.08 | 1.97 | 3.66 |

FIG. 3 shows a relation between the erasing value and the front erasing light percentage, and a relation between that percentage and the front/back erasing value ratio. The bent line connecting solid circles indicates a relation between the front erasing value and the front erasing light percentage, and the line connecting solid squares indicates a relation between the back erasing value and the front erasing light percentage. The chain line indicates a relation between the front/back erasing value ratio and the front erasing light percentage.

The results shown in Table 1 and FIG. 3 teach that if the ratio of front/back erasing light is in the range of 51/49 to 75/25, the front erasing value is relatively small and the difference between the front and the back erasing values is less than 20% based on the back erasing value. Therefore, in that case, a radiation image remaining in a stimulable phosphor sheet is effectively erased by applying erasing light onto both surfaces of the phosphor sheet.

What is claimed is:

1. A process for erasing a radiation image remaining in a stimulable phosphor sheet in which a radiation image was recorded and then read by applying stimulating rays and collecting stimulated emission produced from the phosphor sheet, comprising applying erasing light onto the phosphor sheet under the condition that both front and back surfaces of the phosphor sheet are irradiated with the erasing light so that the ratio of amount of erasing light applied onto the front surface to that applied onto the back surface would be in the range of 51/49 to 75/25.

2. The process of claim 1, wherein the ratio of amount of erasing light applied onto the front surface to that onto the back surface is in the range of 51/49 to 65/35.

3. The process of claim 1, wherein the surfaces of the sheet are irradiated with a first erasing light of UV or visible wavelength, and then irradiated with a second erasing light containing no UV component.

4. The process of claim 3, wherein the first erasing light comprises light of a wavelength longer than 370 nm, and the second erasing light contain no light of a wavelength shorter than 500 nm.

5. The process of claim 3, wherein the ratio of amount of the second erasing light to that of the first erasing light is in the range of 15/85 to 45/55.

6. The process of claim 1, wherein the stimulable phosphor sheet is that in which a radiation image was recorded and then read by applying stimulating rays and collecting the stimulated emission from both the front and back surfaces of the phosphor sheet.

7. The process of claim 1, wherein the stimulable phosphor sheet employed comprises an essentially transparent support and a phosphor layer provided thereon which contains an europium or cerium activated alkaline earth metal halide stimulable phosphor.

* * * * *